Dec. 3, 1929.  E. ANDERSON  1,738,273
FRAME STRUCTURE FOR MOTOR VEHICLE LICENSE PLATES
Filed Dec. 3, 1927
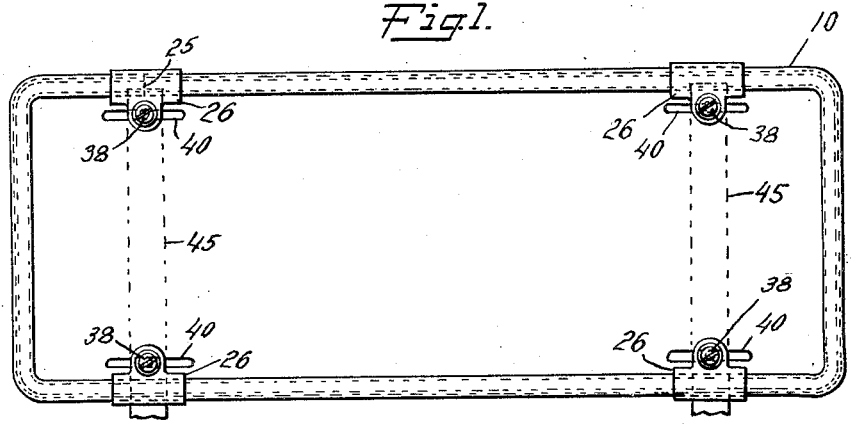
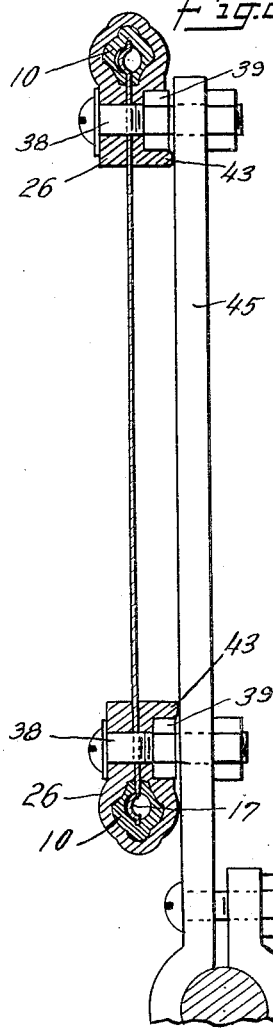
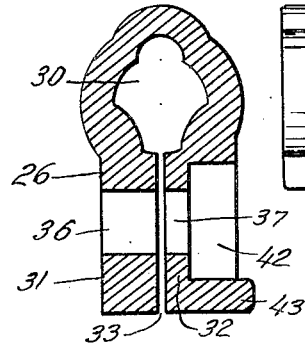
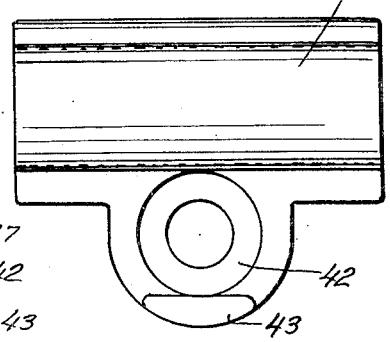
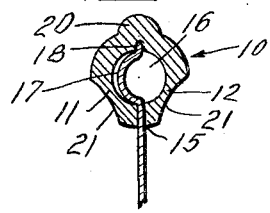
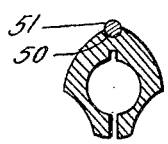
INVENTOR
Emil Anderson
BY
Marshall & Hawley
ATTORNEYS Patented Dec. 3, 1929

1,738,273

UNITED STATES PATENT OFFICE

EMIL ANDERSON, OF BRIARCLIFF MANOR, NEW YORK, ASSIGNOR OF THREE-FOURTHS TO OLSON BROTHERS SAW MANUFACTURING COMPANY, A CORPORATION OF NEW YORK

FRAME STRUCTURE FOR MOTOR-VEHICLE LICENSE PLATES

Application filed December 3, 1927. Serial No. 237,405.

This invention relates to frame structures for motor vehicle license plates.

License plates for motor vehicles are often cheaply made and have rough, sharp edges. Such edges are dangerous as the car user is apt to cut himself on the front plate when cranking the car or on the rear plate when working around the rear end of the car. Moreover, many plates are so cheaply made that they are very unattractive in appearance. Also, the plates often rattle and squeak due to the vibration of the engine or the motion of the chassis or car body.

This invention has for its salient object to provide an attractive edging or frame for automobile license plates comprising a minimum number of parts and a frame that is simple in construction, economical to manufacture and can be easily and quickly secured to any size of license plate.

Another object of the invention is to provide a frame of the class specified that will effectively prevent injury from the sharp edges of the plate and will, furthermore, add to the attractive appearance of the plate.

Another object of the invention is to provide in combination with a frame for license plates, a clamp so constructed and arranged that all rattles, squeaks or other noises due to the vibration of the car or engine will be effectively prevented.

Further objects of the invention will appear from the following specification taken in connection with the drawings which form a part of this application, and in which Fig. 1 is a front elevation of a license plate with a frame and clamps constructed in accordance with the invention secured thereto;

Fig. 2 is a sectional elevation showing the plate, frame and clamps secured to a bracket;

Fig. 3 is a sectional elevation taken through the frame and a portion of the plate secured therein;

Fig. 4 is an elevational view showing one of the clamps;

Fig. 5 is a sectional elevation of the clamp shown in Fig. 4; and

Figs. 6 and 7 are sectional elevations showing slightly modified forms of frame construction.

The invention briefly described consists of a protective frame formed of rubber and preferably formed of a strip of rubber beading, the ends of the strip being brought together and cemented or otherwise secured beneath a clamp. The strip is so formed that it will readily bend around the corners of the plate and is also provided with a thickened portion in alinement with the periphery of the plate so as to effectively enclose the rough edge of the plate and prevent injury therefrom. The clamps used in conjunction with the framing strip are also formed of rubber and are provided with projecting portions adapted to engage bars or brackets by means of which the plate is secured in place and to prevent engagement with such metal parts of the bolts. In one form of the invention, the framing strip has a groove formed therein adapted to receive a wire for more firmly securing the strip on the plate and preventing any possible sagging thereof between the clamps. Further details of the invention will appear from the following description.

In the form of the invention illustrated in the drawings, the frame consists of a strip 10 formed of rubber and as shown in Fig. 3, having a pair of walls 11 and 12. The walls on their free ends are separated as shown at 15 and the remaining portions of the walls are recessed to provide an enlarged opening 16 adapted to receive the bead 17 usually formed adjacent the edge of the plate. A groove 18 is also provided to receive the outer periphery of the plate and the strip adjacent the groove is thickened as shown at 20 to prevent the periphery of the plate from cutting through the framing strip and to provide sufficient material to cushion or enclose the rough outer edge of the plate, thus preventing injury therefrom.

The walls 11 and 12 are reduced in thickness as shown at 21 to facilitate the bending or curving of the framing strip around the corners of the plate.

In order to readily adapt the framing strip to plates of different sizes, the frame is applied in strip form and the ends are cemented or otherwise secured together as shown at 25 in Fig. 1, the joint preferably being enclosed within one of the clamps 26.

The clamps 26 are also formed of rubber and preferably of relatively heavy or thick rubber. Each clamp has a recess 30 so shaped as to conform to the outer surface of the strip and has walls 31 and 32 separated by a gap or slot 33 which as shown in Fig. 5 leads to the recess 30. Since the clamp is formed of rubber, the walls 31 and 32 can be spread apart to receive the frame and outer portion of the plate. The walls 31 and 32 are further provided with alined openings 36 and 37 adapted to receive securing screws or bolts 38 which are secured by nuts 39.

The license plates as is well known are usually provided with slots 40 adapted to receive the securing means and the clamps are placed over the plate and framing strip in alinement with the slots 40. It will be seen from the showing in Figs. 2 and 5 that the wall 32 is provided with a recess 42 to receive the nut 39 and is provided with an extension or lug 43 adapted as shown in Fig. 2 to engage the arm 45 of the bracket by means of which the plate is secured in position and to hold the nut 39 in spaced relation to the metal arm, thus preventing any rattling of the plate.

If desired, in order to more firmly secure the frame in position on the plate, the outer edge of the framing strip may be grooved as shown at 50 in Fig. 6 and a wire 51 is placed in the groove, the ends of the wire being suitably drawn together and secured and preferably being positioned beneath one of the clamps.

In Fig. 7 the groove 52 is positioned in one of the walls of the strip and the wire 53 is secured therein.

From the foregoing description it will be clear that a simple, practical and inexpensive form of frame has been provided for license plates and that the frame will effectively enclose the rough outer edge of the plate, thus preventing injury therefrom. Furthermore, it will be evident that the frame will present an attractive appearance and if desired, the frame can be of such a color and design as to harmonize with the plate or with the body color of the vehicle. When the frame is secured as described, all rattles, squeaks or other noises due to the plate will be effectively prevented.

It will also be obvious that the design of the frame is in the form of a strip and the simple manner of applying the framing strip to the plates, will render the device particularly salable as it will not be necessary for a dealer to carry different sizes of frames.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A frame for license plates comprising a strip of rubber having a groove for receiving the edge of the plate, a thickened wall portion in alinement with the plate, the ends of the strip being secured together, and relatively thin side wall portions spaced from the plate engaging edges of the frame, to facilitate bending the strip around the plate.

2. A frame for license plates comprising a strip of rubber having a recess for receiving the edge of the plate, a thickened wall portion in alinement with the plate, the ends of the strip being secured together, and a clamp formed of rubber and having a recess to receive the frame and edge portion, the clamp being apertured to receive a securing bolt and having a spacing lug adjacent the aperture adapted to engage the part to which the clamp is secured.

3. A clamp for embracing the outer edge and edge frame of a license plate, said clamp being formed of rubber and having a recess to receive the frame and a pair of walls adapted to engage the faces of the plate, said clamp walls being apertured to receive a securing bolt and one wall having a recess to receive a nut and a lug projecting beyond the recessed portion.

4. A clamp for embracing the outer edge and edge frame of a license plate, said clamp having a recess to receive the frame, and a pair of walls adapted to engage the faces of the plate, said clamp walls being apertured to receive a securing bolt, one wall having a recess to receive a nut, and a lug adjacent the aperture and projecting beyond the recessed portion, thereby to space said plate from its support.

In witness whereof, I have hereunto set my hand this 1st day of December, 1927.

EMIL ANDERSON.